United States Patent
Champagne et al.

(10) Patent No.: US 11,760,886 B2
(45) Date of Patent: Sep. 19, 2023

(54) METHOD FOR GRINDING MINERAL MATERIAL

(71) Applicant: COATEX, Genay (FR)

(72) Inventors: Clementine Champagne, Caluire-et-Cuire (FR); Christian Jacquemet, Lyons (FR); Benoit Magny, Cailloux sur Fontaines (FR); Jacques Mongoin, Quincieux (FR); Jean-Marc Suau, Lucenay (FR)

(73) Assignee: COATEX, Genay (FR)

( * ) Notice: Subject to any disclaimer, the term of this patent is extended or adjusted under 35 U.S.C. 154(b) by 949 days.

(21) Appl. No.: 16/466,385

(22) PCT Filed: Dec. 14, 2017

(86) PCT No.: PCT/FR2017/053571
§ 371 (c)(1),
(2) Date: Jun. 4, 2019

(87) PCT Pub. No.: WO2018/109400
PCT Pub. Date: Jun. 21, 2018

(65) Prior Publication Data
US 2020/0255669 A1    Aug. 13, 2020

(30) Foreign Application Priority Data

Dec. 16, 2016 (FR) ...................... 1662582

(51) Int. Cl.
*C09C 3/04* (2006.01)
*C08F 20/06* (2006.01)
*C09C 1/02* (2006.01)
*C09C 3/10* (2006.01)
*D21H 19/56* (2006.01)
*C08F 220/06* (2006.01)
*C09C 1/36* (2006.01)
*B02C 23/06* (2006.01)

(52) U.S. Cl.
CPC ............. *C09C 3/041* (2013.01); *B02C 23/06* (2013.01); *C08F 20/06* (2013.01); *C08F 220/06* (2013.01); *C09C 1/021* (2013.01); *C09C 1/3623* (2013.01); *C09C 3/10* (2013.01); *D21H 19/56* (2013.01); *C01P 2004/51* (2013.01); *C01P 2006/22* (2013.01); *C08F 2438/03* (2013.01)

(58) Field of Classification Search
CPC ........ B02C 23/06; C09C 3/041; C09C 1/3623
USPC ..................................... 241/16, 21
See application file for complete search history.

(56) References Cited

U.S. PATENT DOCUMENTS

| | | | | | |
|---|---|---|---|---|---|
| 6,003,795 | A | * | 12/1999 | Bown | ....................... C09C 3/10 241/16 |
| 9,150,722 | B2 | * | 10/2015 | Suau | ....................... C08L 33/10 |
| 9,957,338 | B2 | * | 5/2018 | Suau | ....................... C08F 20/06 |
| 2014/0088250 | A1 | | 3/2014 | Suau et al. | |
| 2015/0284555 | A1 | | 10/2015 | Suau et al. | |
| 2016/0280816 | A1 | | 9/2016 | Suau | |

FOREIGN PATENT DOCUMENTS

| | | | |
|---|---|---|---|
| EP | 614 948 A1 | * | 9/1994 |
| EP | 2 900 708 A1 | | 8/2015 |
| EP | 3 074 436 A1 | | 10/2016 |
| KR | 10-2011-0052601 A | | 5/2011 |
| WO | WO 2015/079140 | * | 4/2015 |

OTHER PUBLICATIONS

"Thiocarbonylthio End Group Removal from the RAFT-synthesized Polymers by Radical-Induced Reduction" autored by Chong et al., and published in Macromolecules (2007) 40, 4446-4455.*
International Search Report dated Feb. 5, 2018 in PCT/FR2017/053571 filed Dec. 14, 2017.
English translation of Notification of Provisional Rejection dated Apr. 27, 2022 in Korean Patent Application No. 10-2019-7020433, citing document AO therein, 4 pages.

* cited by examiner

*Primary Examiner* — Marc S Zimmer
(74) *Attorney, Agent, or Firm* — Oblon, McClelland, Maier & Neustadt, L.L.P.

(57) ABSTRACT

The present invention relates to a method for producing mineral particles grinding a mineral material in the presence of a specific anionic polymer. The polymer used is obtained by means of polymerisation in the presence of sodium hypophosphite, disodium dipropionate trithiocarbonate and at least one radical-generating compound. The invention also relates to an aqueous composition comprising particles of ground mineral material and such a polymer, in particular a paper coating slip composition.

13 Claims, No Drawings

METHOD FOR GRINDING MINERAL MATERIAL

This invention relates to a method for preparing mineral particles by grinding a mineral matter in the presence of a specific anionic polymer. The polymer used is obtained by polymerisation in the presence of sodium hypophosphite, disodium 2,2'-(thiocarbonylbisthio)dipropanoate (DPTTC) and at least one radical-generating compound. The invention also relates to an aqueous composition comprising particles of ground mineral matter and such a polymer, in particular a paper coating colour composition.

Documents EP 2900708 and EP 3074436 disclose methods for preparing anionic polymers with controlled molecular masses and polymolecularity indices.

Methods of grinding mineral matter are known, especially for grinding mineral materials used in the paper industry. In particular, there are known methods for grinding mineral matter which use grinding aid agents, especially polymers derived from unsaturated monomers comprising one or more carboxylic acid groups. These grinding aid agents control the rheology of the suspension during the grinding operation. Generally, these grinding aid agents reduce as much as possible the flow limit of the mineral filler suspension for grinding while maintaining a sufficient viscosity level during the grinding operation.

In general, the methods of grinding mineral matter must be effective and make it possible to control the particle size distribution of the particles obtained.

Furthermore, the methods of grinding mineral matter must have a high efficacy in terms of grinding time for a particular particle size distribution and for a defined amount of mineral matter. In fact, for the preparation of a defined amount of mineral particles of particular particle size distribution, a reduced use time of the grinding facilities improves the overall yield of the grinding method.

Similarly, it is important to have methods of grinding mineral matter that make it possible to prepare aqueous suspensions of low-viscosity mineral matter particles that are stable shortly after grinding but also several hours or days after grinding. The phenomena of viscosity drift must be controlled because they can lead to gelation of the prepared suspensions which would make handling difficult or impossible. Such viscosity gaps must be the lowest possible. Similarly, the sedimentation phenomena of the particles must be avoided or strongly slowed.

In addition to controlling the stability, it is also essential to control the viscosity of the aqueous suspensions of ground mineral matter particles. In general, controlling the viscosity of the aqueous suspensions of ground mineral matter particles must make it possible to obtain a low viscosity level.

The possibility of preparing aqueous suspensions of mineral matter particles having a high solid content is also important. A high solid content of these aqueous suspensions of mineral matter particles makes it possible in particular to increase the productivity of the methods for preparing these suspensions.

In addition, from an environmental standpoint, it is important to be able to use grinding aid agents enabling the preparation of suspensions of mineral matter particles comprising a lower water amount while maintaining or enhancing the properties of these suspensions.

Moreover, when manufacturing coated and surfaced paper, aqueous compositions of paper coating colours are used to deposit a coat of mineral matter particles and binder on the surface of the sheet of paper in order to change the condition of its surface to improve its printability, sheen or opacity. As an example, for a coated paper used in printing, the coat is obtained from an aqueous dispersion comprised mostly of binders and pigments which are still referred to as "mineral fillers". The most frequently-used pigments in paper coating are kaolin, calcium carbonate, titanium dioxide, talc and organic pigments, in particular the plastic pigments. Within these compositions, the mineral filler is in the form of particles. The use of such paper coating colours notably makes it possible to enhance the physical properties of the paper, in particular to improve its optical properties.

Improving the efficacy of paper-making methods is also made possible through the use of these paper coating colours.

Improving the compatibility of the different compounds used during the preparation of paper should also be sought.

Thus, although there are wet grinding methods for mineral matter which use polymers as a grinding aid agent, the state of the art methods do not always provide a satisfactory solution to the problems encountered. There is therefore a need for improved methods for grinding mineral matter in water.

The method according to the invention provides a solution to all or part of the problems of the state of the art methods.

Thus, the invention provides a method for preparing particles of mineral matter comprising grinding of at least one mineral matter in water in the presence of at least one polymer with a molecular mass by weight $M_W$ (measured by SEC) of less than 8,000 g/mol and a polymolecularity index (PI) or polydispersity index of less than 3, obtained by radical polymerisation reaction in water, at a temperature higher than 50° C., of at least one anionic monomer comprising at least one polymerisable olefinic unsaturation and a carboxylic acid group, in the presence:
- of sodium hypophosphite,
- of disodium 2,2'-(thiocarbonylbisthio)dipropanoate (DPTTC) and
- of at least one radical-generating compound chosen among hydrogen peroxide, ammonium persulphate, an alcalin metal persulphate, hydrogen peroxide associated with an ion chosen among $Fe^{II}$, $Fe^{III}$, $Cu^{I}$, $Cu^{II}$ and mixtures thereof.

During the grinding method according to the invention, the mineral matter used can be in various forms, especially in the form of coarse sized grains from blocks or pieces of crushed mineral matter. When grinding according to the invention, the size of the grains, particularly the coarse sized grains, of mineral matter or pieces of mineral matter used, is reduced until particles are obtained. The method according to the invention is particularly effective for controlling the size of the particles prepared when grinding the mineral matter. According to the invention, the size of the particles is measured by sedimentation.

For the method according to the invention, the particle size can be defined by their median diameter $d_{50}$ for which at least half by weight of a particle population is smaller in size than a given value. Thus, the particles that are less than 50 µm in size are particles belonging to a population of which at least half by weight are less than 50 µm in diameter.

Preferably, the method according to the invention relates to the preparation of particles with a size of less than 50 µm or a size ranging from 0.05 µm to 50 µm.

More preferably, the method according to the invention relates to the preparation of particles of mineral matter with a size of less than 10 µm, or less than 5 µm or less than 2 µm. More preferably, the size of the particles of mineral matter is less than 1 µm or less than 0.5 µm. Also preferably for the method according to the invention, at least 50% by weight of the particles have a size ranging from 0.5 µm to 50 µm, or a size of less than 10 µm. Particularly, at least 50% by weight of the particles have a size of less than 5 µm or 2 µm, or even less than 1 µm.

Advantageously for the method according to the invention, at least 60% by weight of the particles have a size ranging from 0.5 µm to 50 µm or a size of less than 10 µm. Particularly, at least 60% by weight of the particles have a size of less than 5 µm or 2 µm, or even less than 1 µm. Also advantageously for the method according to the invention, at least 75% by weight of the particles have a size that is comprised within a range of from 0.5 to 50 µm or a size of less than 10 µm. Particularly, at least 75% by weight of the particles have a size of less than 5 µm or 2 µm, or even less than 1 µm.

Also advantageously for the method according to the invention, at least 90% by weight of the particles have a size ranging from 0.5 µm to 50 µm or a size of less than 10 µm. Particularly, at least 90% by weight of the particles have a size of less than 5 µm or 2 µm, or even less than 1 µm.

For the method according to the invention, a population of mineral particles can also be defined by an equivalent spherical diameter (esd). Preferably according to the invention, the equivalent spherical diameter of the particles of less than 50 µm in size is equal to 50% by weight. In this case, 50% by weight of the particles are less than 50 µm in size.

Also preferably according to the invention, the equivalent spherical diameter of the particles of a size ranging from 0.05 µm to 50 µm or less than 50 µm is equal to 60% by weight or equal to 70% by weight or even equal to 80% by weight or even equal to 90% by weight.

More preferably according to the invention, the equivalent spherical diameter of the particles of a size of less than 10 µm is equal to 60% by weight or equal to 70% by weight or even equal to 80% by weight or even equal to 90% by weight.

Much more preferably according to the invention, the equivalent spherical diameter of the particles of a size of less than 5 µm is equal to 60% by weight or equal to 70% by weight or even equal to 80% by weight or even equal to 90% by weight.

Even more preferably according to the invention, the equivalent spherical diameter of the particles of a size of less than 2 µm is equal to 60% by weight or equal to 70% by weight or even equal to 80% by weight or even equal to 90% by weight.

Particularly preferably according to the invention, the equivalent spherical diameter of the particles of a size of less than 1 m is equal to 60% by weight or equal to 70% by weight or even equal to 80% by weight or even equal to 90% by weight.

Also preferably according to the invention, the equivalent spherical diameter of the particles of a size of less than 0.5 µm is equal to 60% by weight or equal to 70% by weight or even equal to 80% by weight or even equal to 90% by weight.

Preferably, the method according to the invention uses at least one synthetic mineral matter or of natural origin.

Also preferably, the method according to the invention uses at least one mineral matter chosen among alkaline earth metal carbonates, preferably calcium carbonate (natural calcium carbonate or precipitated calcium carbonate), strontium carbonate, magnesium carbonate, barium carbonate, dolomite, kaolin, titanium dioxide, talc, lime, calcium sulphate, barium sulphate. More preferably, the method according to the invention uses at least one mineral matter chosen among natural calcium carbonate, precipitated calcium carbonate, dolomite, kaolin, calcined kaolin, titanium dioxide, talc, lime.

The method according to the invention can use a single mineral matter or several mineral matters. Thus, the method according to the invention can use two or three mineral matters. In particular, the method according to the invention can use calcium carbonate and at least one other mineral matter chosen among dolomite, kaolin, calcined kaolin, titanium dioxide, talc, lime, especially calcium carbonate and kaolin or calcium carbonate and lime. Similarly, the method according to the invention can use titanium dioxide and at least one other mineral matter chosen among calcium carbonate, dolomite, kaolin, talc, lime, especially titanium dioxide and kaolin or titanium dioxide and lime.

The method according to the invention can also use kaolin or calcined kaolin and at least one other mineral matter chosen among dolomite, talc, lime. The method according to the invention can also use talc and lime or talc and dolomite.

In addition to a mineral matter, the method according to the invention uses at least one particular polymer obtained by radical polymerisation reaction, in the presence of sodium hypophosphite, of disodium 2,2'-(thiocarbonylbisthio)dipropanoate (DPTTC) and of at least one radical-generating compound chosen among hydrogen peroxide, ammonium persulphate, an alcalin metal persulphate, hydrogen peroxide associated with an ion chosen among $Fe^{II}$, $Fe^{III}$, $Cu^{I}$, $Cu^{II}$ and mixtures thereof.

Preferably, the polymerisation reaction is carried out in water or in a solvent mixed with water, especially an alcoholic solvent, in particular isopropyl alcohol. Particularly preferably, the polymerisation reaction is carried out in water only.

According to the invention, the sodium hypophosphite (CAS No. 7681-53-0 or 10039-56-2 for the monohydrate form) is a sodium salt of hypophosphorous acid.

According to the invention, DPTTC is disodium 2,2'-(thiocarbonylbisthio)dipropanoate (CAS No. 864970-33-2). Its sodium salts are used according to the invention.

Also preferably, the polymerisation reaction uses a radical-generating compound chosen among hydrogen peroxide, sodium persulphate, potassium persulphate, ammonium persulphate and mixtures thereof. Particularly preferably, the polymerisation reaction uses a radical-generating compound chosen among hydrogen peroxide and sodium persulphate.

Also preferably, the polymerisation reaction uses, in relation to the amount by weight of monomer:
from 2% by weight to 8% by weight, preferably from 2.5% by weight to 7% by weight or from 2.5% by weight to 6% by weight, of sodium hypophosphite or
from 0.01% by weight to 1.5% by weight, preferably from 0.01% by weight to 1.2% by weight or from 0.05% by weight to 1.5% by weight, more preferably from 0.05% by weight to 1.2% by weight or from 0.1% by weight to 1% by weight, of disodium 2,2'-(thiocarbonylbisthio)dipropanoate (DPTTC) or
from 0.1% by weight to 5% by weight of radical-generating compound or, preferably, from 0.5% by weight to 4.5% by weight of hydrogen peroxide or from 0.1% by weight to 4% by weight of sodium persulphate, of potassium persulphate or of ammonium persulphate.

Also preferably, the polymerisation reaction uses, in relation to the amount by weight of monomer:
from 2% by weight to 8% by weight, preferably from 2.5% by weight to 7% by weight or from 2.5% by weight to 6% by weight, of sodium hypophosphite or from 0.01% by weight to 1.5% by weight, preferably from 0.01% by weight to 1.2% by weight or from 0.05% by weight to 1.5% by weight, more preferably from 0.05% by weight to 1.2% by weight or from 0.1% by weight to 1% by weight, of disodium 2,2'-(thiocarbonylbis-thio)dipropanoate (DPTTC) or from 0.5% by weight to 4.5% by weight of hydrogen peroxide or from 0.1% by weight to 4% by weight of sodium persulphate, of potassium persulphate or of ammonium persulphate.

More preferably, the polymerisation reaction uses, in relation to the amount by weight of monomer:

from 2% by weight to 8% by weight, preferably from 2.5% by weight to 7% by weight or from 2.5% by weight to 6% by weight, of sodium hypophosphite, from 0.01% by weight to 1.5% by weight, preferably from 0.01% by weight to 1.2% by weight or from 0.05% by weight to 1.5% by weight, more preferably from 0.05% by weight to 1.2% by weight or from 0.1% by weight to 1% by weight, of disodium 2,2'-(thiocarbonylbis-thio)dipropanoate (DPTTC) and from 0.1% by weight to 5% by weight of radical-generating compound or, preferably, from 0.5% by weight to 4.5% by weight of hydrogen peroxide or from 0.1% by weight to 4% by weight of sodium persulphate, of potassium persulphate or of ammonium persulphate.

Also more preferably, the polymerisation reaction uses, in relation to the amount by weight of monomer:

from 2% by weight to 8% by weight, preferably from 2.5% by weight to 7% by weight or from 2.5% by weight to 6% by weight, of sodium hypophosphite, from 0.01% by weight to 1.5% by weight, preferably from 0.01% by weight to 1.2% by weight or from 0.05% by weight to 1.5% by weight, more preferably from 0.05% by weight to 1.2% by weight or from 0.1% by weight to 1% by weight, of disodium 2,2'-(thiocarbonylbis-thio)dipropanoate (DPTTC) and from 0.5% by weight to 4.5% by weight of hydrogen peroxide or from 0.1% by weight to 4% by weight of sodium persulphate, of potassium persulphate or of ammonium persulphate.

When using hydrogen peroxide associated with an ion chosen among $Fe^{II}$, $Fe^{III}$, $Cu^{I}$, $Cu^{II}$, these ions can be introduced by means of various chemical compounds. Examples of chemical compounds enabling the introduction of $Fe^{II}$, $Fe^{III}$, $Cu^{I}$, $Cu^{II}$ ions include iron sulphate, hydrated iron sulphate, iron sulphate hemihydrate, iron sulphate heptahydrate, iron carbonate, hydrated iron carbonate, iron carbonate hemihydrate, iron chloride, copper carbonate, hydrated copper carbonate, copper carbonate hemihydrate, copper acetate, copper sulphate, copper sulphate pentahydrate, copper hydroxide, and copper halide.

The weight-average molecular mass $M_W$ (measured by SEC or Size Exclusion Chromatography) of the polymer used according to the invention is less than 8,000 g/mol, and can vary extensively. Also preferably, the polymer according to the invention has a weight-average molecular mass $M_W$ of less than 7,500 g/mol, preferably less than 6,500 g/mol, less than 6,000 g/mol, more preferably less than 5,500 g/mol.

Also preferably, the polymer according to the invention has a weight-average molecular mass $M_W$ greater than 1,000 g/mol or greater than 1,200 g/mol or greater than 1,500 g/mol.

Thus, the polymer according to the invention preferably has a mas-average molecular by weight $M_W$ ranging from 1,000 g/mol to 7,500 g/mol, 6,500 g/mol, 6,000 g/mol or 5,500 g/mol. More preferably, the polymer according to the invention has a weight-average molecular mass $M_W$ ranging from 1,200 g/mol to 7,500 g/mol, 6,500 g/mol, 6,000 g/mol or 5,500 g/mol. Even more preferably, the polymer according to the invention has a weight average molecular mass $M_W$ ranging from 1,500 g/mol to 7,500 g/mol, 6,500 g/mol, 6,000 g/mol or 5,500 g/mol.

Particularly preferably, the polymer according to the invention has a weight-average molecular mass $M_W$ ranging from 3,500 g/mol to 5,500 g/mol. Also particularly preferably, the polymer according to the invention has a weight-average molecular mass $M_W$ ranging from 4,500 g/mol to 5,500 g/mol.

According to the invention, the polymolecularity index PI, or polydispersity index, of the polymer used is less than 3. Preferably, the polymolecularity index PI of the polymer is less than 2.8. Also preferably, the polymolecularity index PI of the polymer ranges from 1.5 to 3. Even more preferably, the polymolecularity index PI of the polymer ranges from 1.5 to 2.8 or from 1.5 to 2.5.

An essential step in the preparation of the polymer used according to the invention is the radical polymerisation reaction of at least one anionic monomer comprising at least one polymerisable olefinic unsaturation and a carboxylic acid group. The polymerisation reaction is known as such. Preferably, it can be carried out at a temperature above 80° C. or above 95° C. It can be carried out in a solvent chosen among water, organic solvents and mixtures thereof, preferably in water.

Preferably according to the invention, the anionic monomer comprising at least one polymerisable olefinic unsaturation and a carboxylic acid group is chosen among acrylic acid, methacrylic acid, an acrylic acid salt, a methacrylic acid salt and mixtures thereof.

Particularly preferably according to the invention, the anionic monomer comprising at least one polymerisable olefinic unsaturation and a carboxylic acid group is acrylic acid.

More particularly preferably according to the invention, the radical polymerisation reaction only uses acrylic acid.

Nevertheless, in addition to the anionic monomer comprising at least one polymerisable olefinic unsaturation and a carboxylic acid group, the radical polymerisation reaction can use at least one other monomer. Preferably, the polymerisation reaction can then also use at least one monomer chosen among:

another anionic monomer comprising at least one different olefinic unsaturation chosen among acrylic acid, methacrylic acid, itaconic acid, maleic acid, their salts, and mixtures thereof, a non-ionic monomer comprising at least one polymerisable olefinic unsaturation, preferably at least one polymerisable ethylenic unsaturation and notably a polymerisable vinyl group, more preferably a non-ionic monomer chosen among the esters of an acid comprising at least one monocarboxylic acid group, in particular an ester of an acid chosen among acrylic acid, methacrylic acid and mixtures thereof, for example styrene, vinylcaprolactam, alkyl acrylate, in particular $C_1$-$C_{10}$-alkyl acrylate, preferably $C_1$-$C_4$-alkyl acrylate, more preferably methyl acrylate, ethyl acrylate, propyl acrylate, isobutyl acrylate, n-butyl acrylate, alkyl methacrylate, in particular $C_1$-$C_{10}$-alkyl methacrylate, preferably $C_1$-$C_4$-alkyl methacrylate, more preferably methyl methacrylate, ethyl methacrylate, propyl methacrylate, isobutyl methacrylate, n-butyl methacrylate, aryl acrylate, preferably phenyl acrylate, benzyl acrylate, phenoxyethyl acrylate, aryl methacrylate, preferably phenyl methacrylate, benzyl methacrylate, phenoxyethyl methacrylate, a compound of formula (I):

wherein:
- $R^1$ represents a polymerisable acrylate group or a polymerisable methacrylate group,
- $R^2$ represents an OH group or an $OCH_3$ group,
- $L^1$ and $L^2$, identical or different, independently represent an ethyloxy group or a propyloxy group and
- m and n, identical or different and of which at least one is different to 0, represent a number less than or equal to 150 and their sum m+n is less than 150 and 2-acrylamido-2-methylpropanesulfonic acid, a salt of 2-acrylamido-2-methyl propanesulfonic acid, 2-(methacryloyloxy)ethanesulfonic acid, a salt of 2-(methacryloyloxy)ethanesulfonic acid (CAS No. 010595-80-9), sodium methallyl sulfonate, styrene sulfonate and mixtures thereof.

During the polymerisation reaction, the amounts of anionic monomer comprising at least one polymerisable olefinic unsaturation and a carboxylic acid group can vary extensively.

Preferably, the polymerisation reaction uses 100% by weight of this anionic monomer.

Likewise, the amounts of the other monomers can also vary extensively. Preferably, the polymerisation reaction can then use from 70% to 99.5% by weight of anionic monomer comprising at least one polymerisable olefinic unsaturation and a carboxylic acid group and from 0.5% to 30% by weight of at least one monomer chosen among:

another different anionic monomer chosen among acrylic acid, methacrylic acid, itaconic acid, maleic acid, their salts and mixtures thereof, a non-ionic monomer comprising at least one polymerisable olefinic unsaturation, preferably at least one polymerisable ethylenic unsaturation and notably a polymerisable vinyl group, more preferably a non-ionic monomer chosen among the esters of an acid comprising at least one monocarboxylic acid group, in particular an ester of an acid chosen among acrylic acid, methacrylic acid and mixtures thereof, for example styrene, vinylcaprolactam, alkyl acrylate, in particular $C_1$-$C_{10}$-alkyl acrylate, preferably $C_1$-$C_4$-alkyl acrylate, more preferably methyl acrylate, ethyl acrylate, propyl acrylate, isobutyl acrylate, n-butyl acrylate, alkyl methacrylate, in particular $C_1$-$C_{10}$-alkyl methacrylate, preferably $C_1$-$C_4$-alkyl methacrylate, more preferably methyl methacrylate, ethyl methacrylate, propyl methacrylate, isobutyl methacrylate, n-butyl methacrylate, aryl acrylate, preferably phenyl acrylate, benzyl acrylate, phenoxyethyl acrylate, aryl methacrylate, preferably phenyl methacrylate, benzyl methacrylate, phenoxyethyl methacrylate, a compound of formula (I):

wherein:
- $R^1$ represents a polymerisable acrylate group or a polymerisable methacrylate group,
- $R^2$ represents an OH group or an $OCH_3$ group,
- $L^1$ and $L^2$, identical or different, independently represent an ethyloxy group or a propyloxy group and
- m and n, identical or different and of which at least one is different to 0, represent a number less than or equal to 150 and their sum m+n is less than 150 and 2-acrylamido-2-methylpropanesulfonic acid, a salt of 2-acrylamido-2-methylpropanesulfonic acid, 2-(methacryloyloxy)ethanesulfonic acid, a salt of 2-(methacryloyloxy)ethanesulfonic acid, sodium methallyl sulfonate, styrene sulfonate and mixtures thereof.

Preferably, the grinding method according to the invention uses a fully or partially neutralised polymer. According to the invention, the neutralisation of the polymer used is carried out by neutralising or salifying all or part of the carboxylic acid groups present within the polymer.

Preferably, the neutralisation is carried out using a base, for example an alcaline metal derivative or an alkaline earth metal derivative. The preferred bases are chosen among NaOH, KOH, $NH_4OH$, $Ca(OH)_2$, $Mg(OH)_2$, monoisopropylamine, triethanolamine, triisopropylamine, 2-amino-2-methyl-1-propanol (AMP), triethylamine, diethylamine, monoethylamine. Particularly preferably, the neutralisation is carried out using NaOH, $Ca(OH)_2$, $Mg(OH)_2$, alone or in combination.

When preparing the polymer according to the invention, a separation step can also be used. According to the invention, the separation can be carried out after the full or partial neutralisation of the polymer used according to the invention. It can also be used prior to neutralising the polymer.

The fully or partially neutralised polymer aqueous solution can be treated according to static or dynamic fractioning methods known as such. To do so, one or more polar solvents especially belonging to the group comprised of methanol, ethanol, n-propanol, isopropanol, butanols, acetone, tetrahydrofuran, can be used, thus resulting in a two-phase separation. During the separation, the least dense phase comprises the largest fraction of the polar solvent and the fraction of polymers of low molecular weight, and the densest phase comprises the fraction of polymers with the highest molecular weight.

The temperature at which the polymer fraction selection is treated can influence the partition coefficient. It is typically comprised between 10° C. and 80° C., preferably between 20° C. to 60° C. During the separation, it is important to control the ratio of the amounts of dilution water and polar solvents.

When using a dynamic separation method, for example centrifugation, the ratios of the extracted fractions typically depend on the centrifugation conditions. The selection of the fraction of the polymers can also be improved by re-treating the densest aqueous phase using a new amount of polar solvent, which can be different. It can also be a mixture of polar solvents. Lastly, the liquid phase obtained after treatment can be distilled to eliminate the solvent(s) used in treatment.

In addition to a grinding method, the invention also relates to a method for preparing an aqueous suspension of particles of mineral matter comprising the implementation of the grinding method according to the invention.

Preferably, the method of preparation according to the invention makes it possible to prepare an aqueous suspension, the solid content in mineral matter of which is greater than 60% by weight. More preferably, the method of preparation according to the invention makes it possible to prepare an aqueous suspension, the solid content in mineral matter of which is greater than 70% by weight. Even more preferably, the method of preparation according to the invention makes it possible to prepare an aqueous suspension, the solid content in mineral matter of which is greater than 75% by weight or greater than 80% by weight of the suspension.

The particular, advantageous or preferred characteristics of the grinding method according to the invention define methods for preparing an aqueous suspension according to the invention which are also particular, advantageous or preferred.

The invention also provides an aqueous composition comprising particles of ground mineral matter and at least one polymer defined for the grinding method according to the invention.

Advantageously, the composition according to the invention can also comprise at least one admixture, in particular at least one admixture chosen among dispersing agents, anti-foaming agents, biocides, colouring agents, lubricant agents and optical brightening agents.

Advantageously, the composition according to the invention can also comprise at least one bonding agent, in particular a natural bonding agent such as starch or a synthetic bonding agent such as a latex.

The invention also provides a method for preparing a paper coating colour comprising the grinding of at least one mineral matter in water in the presence of at least one polymer obtained by radical polymerisation reaction in water, at a temperature higher than 50° C., of at least one anionic monomer comprising at least one polymerisable olefinic unsaturation and a carboxylic acid group, in the presence:
of sodium hypophosphite,
of disodium 2,2'-(thiocarbonylbisthio)dipropanoate (DPTTC) and
of at least one radical-generating compound chosen among hydrogen peroxide, ammonium persulphate, an alcalin metal persulphate, hydrogen peroxide associated with an ion chosen among $Fe^{II}$, $Fe^{III}$, $Cu^{I}$, $Cu^{II}$ and mixtures thereof.

The invention also relates to the use as a grinding aid agent of at least one mineral matter, of at least one polymer obtained by radical polymerisation reaction in water, at a temperature higher than 50° C., of at least one anionic monomer comprising at least one polymerisable olefinic unsaturation and a carboxylic acid group, in the presence:
of sodium hypophosphite,
of disodium 2,2'-(thiocarbonylbisthio)dipropanoate (DPTTC) and
of at least one radical-generating compound chosen among hydrogen peroxide, ammonium persulphate, an alcalin metal persulphate, hydrogen peroxide associated with an ion chosen among $Fe^{II}$, $Fe^{III}$, $Cu^{I}$, $Cu^{II}$ and mixtures thereof.

Preferably for use as a grinding aid agent according to the invention, the polymer used is the anionic polymer of the grinding method according to the invention.

The invention also provides a paper preparation method comprising the use of an aqueous composition according to the invention.

The particular, advantageous or preferred characteristics of the grinding method according to the invention define aqueous compositions, uses and preparation methods according to the invention which are also particular, advantageous or preferred.

The following examples illustrate the various aspects of the invention. The methods or techniques used are known or described.

EXAMPLES

Molecular Mass by Size Exclusion Chromatography (SEC)

The molecular weights and polymolecularity indices of the polymers obtained by a radical polymerisation reaction in water, at a temperature higher than 50° C., of at least one monomer comprising at least one polymerisable olefinic unsaturation and a carboxylic acid group, are measured by Size Exclusion Chromatography.

A test portion of the polymer solution corresponding to 90 mg of dry matter is placed into a 10 mL flask. The mobile phase, supplemented with 0.04% dimethylformamide (DMF), is added to a total mass of 10 g. The composition of this mobile phase is as follows: $NaHCO_3$: 0.05 mol/L, $NaNO_3$: 0.1 mol/L, triethanolamine: 0.02 mol/L, $NaN_3$ 0.03% mass.

The SEC chain is composed of a Waters 510 isocratic pump with a flow rate set to 0.8 mL/min, a Waters 717+ sample changer, an oven containing a Waters Ultrahydrogel Guard-type precolumn 6 cm long and 40 mm internal diameter, followed by a Waters Ultrahydrogel linear column 30 cm long and 7.8 mm internal diameter.

Detection is provided by means of a Waters 410 RI differential refractometer. The oven is heated to 60° C. and the refractometer is heated to 45° C.

The SEC device is calibrated with a series of sodium polyacrylate standards provided by Polymer Standards Service with a peak molecular weight comprised between 1,000 g/mol and $1 \cdot 10^6$ g/mol and a polymoleculularity index comprised between 1.4 and 1.7, as well as with a sodium polyacrylate with a molecular weight of 5,600 g/mol and a polymolecularity index equal to 2.4. The calibration curve is of linear type and takes into account the correction obtained by means of the flow rate marker: dimethylformamide (DMF).

Acquisition and treatment of the chromatogram are carried out using the PSS WinGPC Scientific software v. 4.02. The chromatogram obtained is incorporated into the zone corresponding to molecular weights greater than 65 g/mol.

Grinding Technique and Particle Size Distribution Measurement

Using a peristaltic pump, suspensions of coarse grains of mineral matter prepared in the presence of a polymer according to the invention or to a comparative polymer are introduced into a 1.4 L Dyno Mill KDL grinder containing 2,850 g of ZirPro ER 120 S ceramic beads with a diameter of from 0.6 mm to 1.0 mm. The grinding conditions are adjusted so as to obtain a suspension of particles of mineral matter of the desired particle size distribution. The necessary amount of polymer introduced into the system is adjusted to achieve the desired particle size distribution. This suspension is then characterised using a particle size measurement, a Brookfield viscosity measurement followed by a stability test. This stability test consists in measuring the Brookfield viscosity of the ground suspension after a resting time of 8 days at a temperature of 25° C.±1° C. The particle size characteristics relative to the preparation of particles of mineral matter are determined using a SediGraph III 5120 apparatus (Micrometrics, USA). In a known manner, this method and this measuring instrument make it possible to measure the particle size distribution of the suspensions of mineral matter particles. They enable in particular to determine the percentage of the mass fraction of a population of mineral particles with an equivalent spherical diameter of less than 1 µm or 2 µm (esd<1 µm or esd<2 µm, both expressed in %). These measurements are carried out from a suspension of particles of diluted mineral matter at a concentration of approximately 33 g of dry matter per litre of solution of a sodium polyacrylate with a molecular weight of 4,000 g/mol and concentration equal to 1.6 g of dry sodium polyacrylate per litre of solution. This sample is dispersed and sonicated before measurement.

Brookfield Viscosity Measurement

Brookfield viscosities (mPa·s) of suspensions of particles of mineral matter prepared according to the method of the invention are measured after the grinding operation (VB0) and after 8 days at rest (VB8) at 25° C.±1° C. and at a rotation speed of 100 rpm using a Brookfield DVIII viscometer equipped with a suitable module, for example 2 to 5.

Example 1: Preparation of Co-Neutralised Polymers According to the Invention

Place a mixture (R) of water and sodium hypophosphite in a stirred reactor. Then, prepare mixture 1 (M1), mixture 2 (M2) and mixture 3 (M3) from water, acrylic acid (AA), hydrogen peroxide or sodium persulphate, sodium hypophosphite and DPTTC. The reactor is then heated so as to reach the polymerisation temperature (T in ° C.) and mixtures 1, 2 and 3 are simultaneously introduced into the reactor. Lastly, the reactor is cooled down and the polymer is neutralised by injecting the pre-prepared neutralisation mixture (MN). The amounts of reagents (in g), the reaction conditions and the characteristics of the prepared polymers (solid content SC, molecular mass $M_W$ and polymolecularity index PI) are shown in Tables 1, 2 and 3.

TABLE 1

| | Example | 1-1 | 1-2 | 1-3 | 1-4 | 1-5 | 1-6 | 1-7 | 1-8 |
|---|---|---|---|---|---|---|---|---|---|
| R | water | 282.8 | 282.8 | 198 | 198 | 198 | 277.2 | 277.2 | 282.8 |
| | $NaH_2PO_2 \cdot H_2O$ | 2.61 | 2.47 | 15 | 13 | 9 | 12 | 12 | 2.72 |
| M1 | AA | 439.8 | 439.8 | 208.6 | 208.6 | 208.6 | 205.6 | 205.6 | 439.8 |
| | DPTTC 20% | 0 | 0 | 13.41 | 13.41 | 13.41 | 4.26 | 4.26 | 0 |
| | water | 48.8 | 48.8 | 0 | 0 | 0 | 0 | 0 | 48.8 |
| M2 | $H_2O_2$ 35% | 0 | 0 | 7.1 | 7.1 | 7.1 | 3.5 | 4.5 | 0 |
| | Na persulphate | 6.96 | 6.56 | 0 | 0 | 0 | 0 | 0 | 1.85 |
| | water | 97.1 | 97.1 | 130 | 130 | 130 | 27.2 | 27.2 | 97.1 |
| M3 | $NaH_2PO_2 \cdot H_2O$ | 23.45 | 22.21 | 0 | 0 | 0 | 0 | 0 | 24.44 |
| | DPTTC 20% | 0.23 | 2.2 | 0 | 0 | 0 | 0 | 0 | 0.23 |
| | water | 81.2 | 81.2 | 0 | 0 | 0 | 0 | 0 | 81.2 |
| MN | water | 471.9 | 471.9 | 185 | 185 | 185 | 185 | 185 | 489.4 |
| | NaOH 50% | 238.1 | 241.1 | 113.6 | 113.6 | 115.9 | 104.3 | 104.3 | 239.5 |
| | $Ca(OH)_2$ 97% | 116.1 | 117.2 | 55.31 | 55.31 | 56.44 | 62.08 | 62.08 | 117.9 |
| | T (° C.) | 97 ± 1 | 97 ± 1 | 90 ± 2 | 90 ± 2 | 90 ± 2 | 90 ± 2 | 90 ± 2 | 97 ± 1 |
| | SC (%) | 36 | 35.2 | 33.16 | 32.62 | 32.67 | 34.11 | 33.98 | 35.1 |
| | Mw (g/mol) | 4,845 | 4,915 | 4,205 | 4,910 | 6,375 | 5,780 | 5,890 | 4,915 |
| | PI | 2.2 | 2.2 | 2.2 | 2.3 | 2.5 | 2.4 | 2.3 | 2.1 |

TABLE 2

| | Example | 2-1 | 2-2 | 2-3 | 2-4 | 2-5 | 2-6 |
|---|---|---|---|---|---|---|---|
| R | Water | 198 | 198 | 198 | 198 | 198 | 198 |
| | $NaH_2PO_2 \cdot H_2O$ | 11 | 11.5 | 12 | 13 | 14 | 15 |
| M1 | AA | 208.65 | 208.65 | 208.65 | 208.65 | 208.65 | 208.65 |
| | DPTTC 20% | 13.41 | 13.41 | 13.41 | 13.41 | 13.41 | 13.41 |
| | Water | 23.18 | 0 | 23.18 | 23.18 | 23.18 | 23.18 |
| M2 | $H_2O_2$ 35% | 7.1 | 7.1 | 7.1 | 7.1 | 7.1 | 7.1 |
| | Na persulphate | 0 | 0 | 0 | 0 | 0 | 0 |
| | Water | 130 | 130 | 130 | 130 | 130 | 130 |
| M3 | $NaH_2PO_2 \cdot H_2O$ | 0 | 0 | 0 | 0 | 0 | 0 |
| | DPTTC 20% | 0 | 0 | 0 | 0 | 0 | 0 |
| | Water | 0 | 0 | 0 | 0 | 0 | 0 |
| MN | Water | 170 | 170 | 170 | 170 | 170 | 170 |
| | NaOH 50% | 160.66 | 159.85 | 160.66 | 159.03 | 159.85 | 159.85 |
| | $Ca(OH)_2$ 97% | 33.52 | 33.35 | 33.52 | 33.52 | 33.18 | 33.35 |
| | T (° C.) | 90 ± 2 | 90 ± 2 | 90 ± 2 | 90 ± 2 | 90 ± 2 | 90 ± 2 |
| | SC (%) | 31.69 | 32.5 | 31.69 | 31.68 | 31.38 | 31.5 |
| | Mw (g/mol) | 6,165 | 5,465 | 5,640 | 5,225 | 5,145 | 4,590 |
| | PI | 2.4 | 2.5 | 2.3 | 2.3 | 2.3 | 2.2 |

TABLE 3

| | Example | 3-1 | 3-2 | 3-3 | 3-4 |
|---|---|---|---|---|---|
| R | Water | 198 | 198 | 198 | 198 |
| | $NaH_2PO_2 \cdot H_2O$ | 14 | 13 | 12 | 15 |
| M1 | AA | 208.65 | 208.65 | 208.65 | 231.83 |
| | DPTTC 20% | 13.41 | 13.41 | 13.41 | 13.41 |
| | Water | 23.18 | 23.18 | 23.18 | 23.18 |
| M2 | $H_2O_2$ 35% | 7.1 | 7.1 | 7.1 | 7.1 |
| | Na persulphate | 0 | 0 | 0 | 0 |
| | Water | 130 | 130 | 130 | 130 |
| M3 | $NaH_2PO_2 \cdot H_2O$ | 0 | 0 | 0 | 0 |
| | DPTTC 20% | 0 | 0 | 0 | 0 |
| | Water | 0 | 0 | 0 | 0 |
| MN | Water | 0 | 0 | 0 | 0 |
| | NaOH 50% | 228 | 228 | 228 | 228 |
| | $Ca(OH)_2$ 97% | 0 | 0 | 0 | 0 |
| | T (° C.) | 90 ± 2 | 90 ± 2 | 90 ± 2 | 90 ± 2 |
| | SC (%) | 36.13 | 36.73 | 36.65 | 36.63 |
| | Mw (g/mol) | 5,010 | 4,830 | 5,325 | 4,445 |
| | PI | 2.2 | 2.2 | 2.3 | 2.2 |

Example 2: Preparation of Comparative Co-Neutralised Polymers

In a similar manner to Example 1, comparative polymers were prepared. The amounts of reagents (in g), the reaction conditions and the characteristics of the prepared polymers are shown in Table 4.

TABLE 4

| Example | | C1 | C2 | C3 | C4 |
|---|---|---|---|---|---|
| R | Water | 282.8 | 244.40 | 224.93 | 262.71 |
|   | $CuSO_4 \cdot 5H_2O$ | 0 | 0.32 | 0.30 | 0.35 |
|   | $FeSO_4 \cdot 7H_2O$ | 0 | 0.28 | 0.25 | 0.30 |
|   | $NaH_2PO_2 \cdot H_2O$ | 2.74 | 0 | 0 | 0 |
| M1 | AA | 439.82 | 279.82 | 257.91 | 301.8 |
|   | DPTTC 20% | 0 | 0 | 0 | 0 |
|   | Water | 48.8 | 0 | 0 | 0 |
| M2 | $H_2O_2$ 35% | 0 | 35.33 | 32.57 | 38.11 |
|   | Na persulphate | 7.33 | 0 | 0 | 0 |
|   | Water | 97.1 | 9.34 | 8.62 | 10.07 |
| M3 | $NaH_2PO_2 \cdot H_2O$ | 24.68 | 0 | 0 | 0 |
|   | DPTTC 20% | 0 | 3.47 | 3.55 | 3.74 |
|   | Water | 81.2 | 31.15 | 28.71 | 25.52 |
| MN | Water | 357.37 | 127.99 | 226.73 | 27.86 |
|   | NaOH 50% | 248.91 | 144.99 | 80.35 | 323.53 |
|   | $Ca(OH)_2$ 97% | 118.63 | 42.41 | 60.18 | 0 |
|   | T (° C.) | 97 ± 1 | 93 ± 1 | 93 ± 1 | 93 ± 1 |
|   | SC (%) | 35.3 | 38 | 35 | 41.2 |
|   | Mw (g/mol) | 4,710 | 5,700 | 5,700 | 5,700 |
|   | PI | 2.1 | 2.6 | 2.5 | 2.6 |

Example 3: Grinding of Calcium Carbonate with an Esd of Less than 1 μm Equal to 80% by Weight The polymers according to the invention and a comparative polymer are used as a grinding aid agent for natural calcium carbonate. The various polymers are used at the same doses and in the same operating conditions.

Aqueous suspensions of natural calcium carbonate are prepared with a solid content by weight of 76%±1%. They are prepared in the presence of an amount of 1.07% by dry weight of an aqueous polymer solution, as a grinding aid agent, with regard to the solid content in calcium carbonate used in this grinding operation in order to obtain the desired particle size distribution. The polymer solutions have a concentration of 35%±1% in active matter and a pH of 8.5±0.5. The raw material used to prepare these aqueous suspensions is an aqueous suspension of coarse grain calcium carbonate with a solid content of 75%±1% by weight. Calcium carbonate is a coarse marble (marketed as Omyacarb 10 AV Omya) from the Carrare region in Italy. The grinding conditions were adjusted so as to obtain a suspension of mineral particles of which 80.0%±0.5% by weight of its population has an equivalent spherical diameter of less than 1 μm (esd<1 μm=80.0%±0.5%).

The suspensions according to the invention and the comparative suspension are then analysed and characterised using Brookfield viscosity measurements after the grinding operation, then after 8 days at rest at 25° C. The results are shown in Table 5.

TABLE 5

| Suspension | Polymer | VB0 | VB8 |
|---|---|---|---|
| S1-1 | 1-1 | 291 | 650 |
| S1-2 | 1-2 | 299 | 645 |
| S1-3 | 1-3 | 232 | 750 |
| SC1 | C1 | 310 | 983 |

The use of the grinding aids according to the invention makes it possible to prepare low-density suspensions of ground calcium carbonate. The viscosities of these suspensions change less significantly over time for an 8-day period than that of the suspension prepared in the presence of the comparative polymer. The suspensions prepared according to the invention therefore have lower viscosities than those of the comparative test suspension. They are more stable.

Example 4: Grinding of Calcium Carbonate with an Esd of Less than 1 μm Equal to 80% by Weight The polymers according to the invention and a comparative polymer are used as a grinding aid agent for natural calcium carbonate. The various polymers are used at the same doses and in the same operating conditions.

Aqueous suspensions of natural calcium carbonate are thus prepared with a solid content by weight of 76%±1%. They are prepared in the presence of an effective amount (EA, expressed in % dry/dry) by dry weight of an aqueous polymer solution in relation to 100 g of dry calcium carbonate used as a grinding aid agent in order to obtain the desired particle size distribution. The polymer solutions have a concentration of 35%±1% in active matter and a pH of 8.5±0.5. The raw material used to prepare these aqueous suspensions is an aqueous suspension of coarse grain calcium carbonate with a solid content of 75%±1% by weight. Calcium carbonate is a coarse calcite (marketed as BL 200 Omya) from the Orgon region in France. The grinding conditions were adjusted so as to obtain a suspension of mineral particles of which 80.0%±0.5% by weight of its population has an equivalent spherical diameter of less than 1 μm (esd<1 μm=80.0%±0.5%).

The calcium carbonate suspensions are then analysed and characterised using Brookfield viscosity measurements after the grinding operation, then after 8 days at rest at 25° C. The effective amount (EA) of dry polymer for obtaining the desired particle size distribution is also measured. The results are shown in Table 6.

TABLE 6

| Suspension | Polymer | EA | VB0 | VB8 |
|---|---|---|---|---|
| S2-1 | 2-1 | 0.93 | 679 | 1,356 |
| S2-2 | 2-2 | 0.99 | 508 | 1,406 |
| S2-3 | 2-3 | 0.96 | 670 | 1,352 |
| S2-4 | 2-4 | 0.95 | 547 | 1,226 |
| S2-5 | 2-5 | 0.95 | 580 | 1,326 |
| SC2 | C2 | 1.05 | 1,019 | 1,786 |

The use of the polymers according to the invention makes it possible to reduce the effective amount of the grinding aid agent. Again, the use of the grinding aid agents according to the invention makes it possible to prepare low-viscosity suspensions of ground calcium carbonate. The viscosities of these suspensions change less significantly over time for an 8-day period than that of the suspension prepared in the presence of the comparative polymer. The suspensions prepared according to the invention therefore have lower viscosities than those of the comparative test suspension. They are more stable.

Example 5: Grinding of Calcium Carbonate with an Esd of Less than 2 µm Equal to 60% by Weight The polymers according to the invention and a comparative polymer are used as a grinding aid agent for natural calcium carbonate. The various polymers are used at the same doses and in the same operating conditions.

Aqueous suspensions of natural calcium carbonate are thus prepared with a solid content by weight of 74%±1%. They are prepared in the presence of an amount of 0.26% by dry weight of an aqueous polymer solution, as a grinding aid agent, with regard to the solid content in calcium carbonate used in this grinding operation in order to obtain the desired particle size distribution. The polymer solutions have a concentration of 35%±1% in active matter and a pH of 8.5±0.5. The raw material used to prepare these aqueous suspensions is an aqueous suspension of coarse grain calcium carbonate with a solid content of 75%±1% by weight. Calcium carbonate is a coarse marble (marketed as Omyacarb 10 AV Omya) from the Carrare region in Italy. The grinding conditions are adjusted so as to obtain a suspension of mineral particles of which 60.0%±0.5% by weight of its population has an equivalent spherical diameter of less than 2 µm (esd<2 µm=60.0%±0.5%).

The calcium carbonate suspensions are then analysed and characterised using Brookfield viscosity measurements after the grinding operation, then after 8 days at rest at 25° C. The results are shown in Table 7.

TABLE 7

| Suspension | Polymer | VB0 | VB8 |
|---|---|---|---|
| S3-1 | 3-1 | 98 | 276 |
| S3-2 | 3-2 | 105 | 304 |
| SC3 | C3 | 123 | 450 |

Again, the use of the grinding aid agents according to the invention makes it possible to prepare low-viscosity suspensions of ground calcium carbonate. The viscosities of these suspensions change less significantly over time for an 8-day period than that of the suspension prepared in the presence of the comparative polymer. The suspensions prepared according to the invention therefore have lower viscosities than those of the comparative test suspension. They are more stable.

The invention claimed is:

1. A method for preparing particles of at least one mineral matter, the method comprising:
grinding the at least one mineral matter in water in the presence of at least one polymer with a molecular mass by weight $M_W$ (measured by SEC) of less than 8,000 g/mol and a polymolecularity index (PI) of less than 3, wherein
the particles have a size of 50 µm or less,
the at least one polymer is obtained by a radical polymerisation reaction in water or a solvent mixed with water, at a temperature higher than 50° C., of at least one anionic monomer selected from the group consisting of acrylic acid, methacrylic acid, an acrylic acid salt, and a methacrylic acid salt, in the presence of:
sodium hypophosphite,
0.01 to 1.5% by weight of disodium 2,2'-(thiocarbonyl-bisthio)dipropanoate (DPTTC); and
0.1% to 5% by weight of at least one radical-generating compound selected from the group consisting of hydrogen peroxide, sodium persulphate, potassium persulphate, ammonium persulphate,
wherein the viscosity of a suspension of the at least one mineral matter and the at least one polymer change less over an 8-day period than that of a suspension of the at least one mineral matter with a polymer that is otherwise the same as the at least one polymer but prepared in the absence of DPTTC and hypophosphite.

2. The method of claim 1, wherein:
only one mineral matter or two or three mineral matters are subjected to the grinding or
the at least one mineral matter is synthetic or of natural origin.

3. The method of claim 1, wherein the radical polymerisation reaction is carried out in a solvent mixed with water.

4. The method of claim 1, wherein the at least one polymer has:
a weight-average molecular mass $M_W$ in a range of 1,000 g/mol to 7,500 g/mol or
or
a polymolecularity index (PI) of less than 2.8.

5. The method of claim 1, wherein the radical polymerisation reaction further comprises at least one monomer selected from the group consisting of:
another different anionic monomer selected from the group consisting of acrylic acid, methacrylic acid, itaconic acid, maleic acid, and salts thereof, and mixtures thereof;
a non-ionic monomer comprising at least one polymerisable olefinic unsaturation; and
2-acrylamido-2-methylpropanesulfonic acid, a salt of 2-acrylamido-2-methylpropanesulfonic acid, 2-(methacryloyloxy)ethanesulfonic acid, a salt of 2-(methacryloyloxy)ethanesulfonic acid, sodium methallyl sulfonate, styrene sulfonate and mixtures thereof.

6. The method of claim 1, wherein the radical polymerisation reaction comprises:
100% by weight of the at least one anionic monomer or from 70% to 99.5% by weight of the at least one anionic monomer and from 0.5% to 30% by weight of at least one monomer selected from the group consisting of:
another different anionic monomer selected from the group consisting of acrylic acid, methacrylic acid, itaconic acid, maleic acid, and salts thereof, and mixtures thereof;
a non-ionic monomer comprising at least one polymerisable olefinic unsaturation; and
2-acrylamido-2-methylpropanesulfonic acid, a salt of 2-acrylamido-2-methylpropanesulfonic acid, 2-(methacryloyloxy)ethanesulfonic acid, a salt of 2-(methacryloyloxy)ethanesulfonic acid, sodium methallyl sulfonate, styrene sulfonate and mixtures thereof.

7. A method for preparing an aqueous suspension of particles of mineral matter, the method comprising implementing the grinding method of claim 1, to obtain particles of at least one mineral matter, and combining the particles with water to obtain an aqueous suspension with a solid content in mineral matter greater than 60% by weight.

8. An aqueous composition, comprising:
particles of ground mineral matter obtained by or obtainable with the method of claim 1, and
at least one polymer with a molecular mass by weight $M_W$ (measured by SEC) of less than 8,000 g/mol and a polymolecularity index (PI) of less than 3, obtained by a radical polymerisation reaction in water, at a temperature higher than 50° C., of at least one anionic monomer comprising at least one polymerisable olefinic unsaturation and a carboxylic acid group, in the presence of:

sodium hypophosphite, disodium 2,2'-(thiocarbonylbisthio)dipropanoate (DPTTC); and at least one radical-generating compound selected from the group consisting of hydrogen peroxide; ammonium persulphate; an alcalin metal persulphate; hydrogen peroxide associated with an ion selected from the group consisting of $Fe^{II}$, $Fe^{III}$, $Cu^{I}$, and $Cu^{II}$; and mixtures thereof.

9. The aqueous composition of claim 8, further comprising an admixture selecting from the group consisting of dispersing agent, anti-foaming agent, biocide, colouring agent, lubricant agent, optical brightening agent, and bonding agent.

10. A method for preparing a paper coating colour, the method comprising:

grinding at least one mineral matter in water in the presence of at least one polymer obtained by a radical polymerisation reaction in water or a solvent mixed with water, at a temperature greater than 50° C., of at least one anionic monomer selected from the group consisting of acrylic acid, methacrylic acid, an acrylic acid salt, and a methacrylic acid salt, in the presence of:

sodium hypophosphite, 0.01 to 1.5% by weight of disodium 2,2'-(thiocarbonyl-bisthio)dipropanoate (DPTTC) and 0.1% to 5% by weight of at least one radical-generating compound selected from the group consisting of hydrogen peroxide, sodium persulphate, potassium persulphate, ammonium persulphate, wherein the viscosity of a suspension of the at least one mineral matter and the at least one polymer change less over an 8-day period than that of a suspension of the at least one mineral matter with a polymer that is otherwise the same as the at least one polymer but prepared in the absence of DPTTC and hypophosphite.

11. A grinding aid agent, comprising:

at least one mineral matter, and at least one polymer obtained by a radical polymerisation reaction in water or a solvent mixed with water, at a temperature greater than 50° C., of at least one anionic monomer selected from the group consisting of acrylic acid, methacrylic acid, an acrylic acid salt, and a methacrylic acid salt, in the presence:

sodium hypophosphite, 0.01 to 1.5% by weight of disodium 2,2'-(thiocarbonyl-bisthio)dipropanoate (DPTTC) and 0.1% to 5% by weight of at least one radical-generating compound selected from the group consisting of hydrogen peroxide, sodium persulphate, potassium persulphate, ammonium persulphate, wherein the viscosity of a suspension of the at least one mineral matter and the at least one polymer change less over an 8-day period than that of a suspension of the at least one mineral matter with a polymer that is otherwise the same as the at least one polymer but prepared in the absence of DPTTC and hypophosphite.

12. The grinding aid agent of claim 11, wherein the at least one polymer has a molecular mass by weight $M_W$ (measured by SEC) of less than 8,000 g/mol and a polymolecularity index (PI) of less than 3.

13. A paper product, obtained or obtainable from the aqueous composition of claim 8.

* * * * *